United States Patent [19]

Kobayashi et al.

[11] Patent Number: 6,103,828
[45] Date of Patent: Aug. 15, 2000

[54] MACROMOLECULAR MATERIAL COMPOSITION AND A MODIFIER FOR MACROMOLECULAR MATERIAL

[75] Inventors: Yuji Kobayashi; Takayuki Saitoh; Atsushi Fujioka, all of Ibaraki-ken; Akihiro Kobayashi; Fumiaki Kanega, both of Chiba-ken; Kiyotaka Mashita, Ibaraki-ken; Tohru Haruna; Takashi Takeuchi, both of Saitama-ken, all of Japan

[73] Assignees: Hitachi Chemical Co. Ltd.; Asahi Denka Kogyo K.K., both of Tokyo, Japan

[21] Appl. No.: 09/179,951

[22] Filed: Oct. 28, 1998

[30] Foreign Application Priority Data

Oct. 28, 1997 [JP] Japan .................................... 9-294717

[51] Int. Cl.$^7$ ........................................................ C08K 5/01
[52] U.S. Cl. ........................ 525/216; 525/240; 525/332.1; 524/554; 524/326; 526/283; 526/308

[58] Field of Search ...................................... 525/216, 240, 525/332.1, 332.2; 524/554, 326; 526/283, 292.5, 293, 308

[56] References Cited

U.S. PATENT DOCUMENTS 5,362,782  11/1994  McCullough, Jr. et al. ............ 525/240

FOREIGN PATENT DOCUMENTS 61-46014  10/1986  Japan .
6-41362   2/1994   Japan .

*Primary Examiner*—James J. Seidleck
*Assistant Examiner*—Olga Asinovsky
*Attorney, Agent, or Firm*—Fish & Richardson P.C.

[57] ABSTRACT

A macromolecular material composition which comprises a macromolecular material and a modifier which comprises a polyvinyl cyclohexane compound having hydroindane structure. The modifier improves melt flow characteristics, flexibility at a low temperature, and mechanical characteristics, such as bending modulus and bending strength, of the material, and do not bleed or give bad smell.

11 Claims, No Drawings

MACROMOLECULAR MATERIAL COMPOSITION AND A MODIFIER FOR MACROMOLECULAR MATERIAL

BACKGROUND OF THE INVENTION

1. Field of the Invention

The present invention relates to a macromolecular material composition and a modifier for macromolecular material.

2. Description of the Prior Art

Macromolecular materials, such as polyolefin resins, such as polyethylene, polypropylene, polybutene-1, ethylene-propylene copolymer, ethylene-ethyl acetate copolymer and ethylene-propylene-diene copolymer; polyester resins, such as polyethylene terephthalate and polybutylene terephthalate; thermoplastic resins, such as polystyrene, polyamide, polycarbonate, polyphenylene oxide, polyphenylene sulfide and polyvinyl chloride; thermosetting resins, such as phenol resin, epoxy resin, urethane resin, melamine resin, urea resin, unsaturated polyester resin, diallyl phthalate resin, silicon resin and polyimide resin; rubber, such as butadiene rubber, acrylonitrile-butadiene rubber, styrene butadiene rubber, acrylonitrile-butadiene-styrene rubber and natural rubber; are excellent in mechanical strength, stretch, electrical property, and resistance to water and chemicals. The macromolecular materials have been widely used as film, sheet, covering material and various molding materials.

Especially, polyolefinic elastomers such as ethylene-propylene copolymer elastomer and olefinic elastomer, and ethylene-propylene-diene copolymer elastomer, and olefinic thermoplastic elastomers comprising the above-mentioned polyolefinic elastomer as soft segment, and crystalline polyolefin resin as hard segment are excellent in impact resilience, and impact strength. They maintain the above-mentioned properties of the polyolefinic macromolecular materials and come into the public limelight as materials having improved elastomeric properties.

However, the above-mentioned macromolecular materials have disadvantages that they have low processing properties due to low melt flow characteristics, and they are fragile due to low flexibility at a low temperature.

Therefore, there has been proposed to blend in the macromolecular materials various softeners such as plasticizers such as phthalate ester and adipate ester, hydrogenated terphenyl, naphthenic hydrocarbon oil, paraffinic hydrocarbon oil and aromatic hydrocarbon oil. These softeners however do not improve satisfactorily the above disadvantages but they bleed to the surface of the macromolecular material, or give off a bad smell.

Japanese Patent Publication for Opposition Purpose (hereinafter referred to as "J. P. KOKOKU") No. Sho 61-46014 discloses that the bleeding and smell of the softeners was improved by using liquid aliphatic hydrocarbon which has at least three cyclohexane rings. However, improvement of melt flow characteristics was insufficient.

Japanese Patent Unexamined Published Application (hereinafter referred to as "J. P. KOKAI" No. Hei 6-41362 discloses that the melt flow characteristics was improved by using 1,2-(3,4-dimethyl cyclohexyl) ethane. However, the improvement was insufficient, and further improvement is desired.

SUMMARY OF THE INVENTION

Accordingly, a first object of the present invention is to provide a macromolecular material composition which is excellent in melt flow characteristics.

A second object of the present invention is to provide a macromolecular material composition which is excellent in flexibility at a low temperature, in addition to the foregoing characteristic properties.

A third object of the present invention is to provide a macromolecular material composition which is excellent in mechanical characteristics, such as bending modulus and bending strength, in addition to the foregoing characteristic properties.

A fourth object of the present invention is to provide a macromolecular material composition which is much more excellent in melt flow characteristics, bending modulus and bending strength, in addition to the foregoing characteristic properties.

A fifth object of the present invention is to provide a modifier for macromolecular material which can improve melt flow characteristics, flexibility at a low temperature, and mechanical characteristics, such as bending modulus and bending strength, of the material, and do not bleed or give bad smell.

The present invention relates to a macromolecular material composition which comprises a polyvinyl cyclohexane compound having hydroindane structure.

The present invention further relates to a macromolecular material composition which comprises a polyvinyl cyclohexane compound having hydroindane structure of the general formula (I):

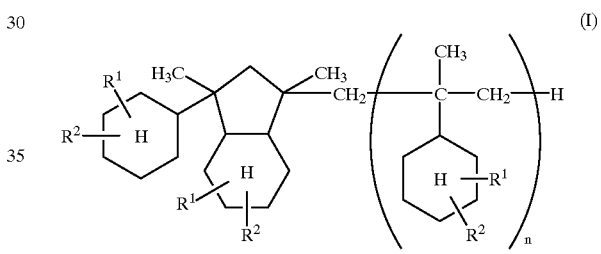

wherein $R^1$ and $R^2$ are the same or different, and represent hydrogen atoms or alkyl groups having from 1 to 12 carbon atoms, and n is an integer ranging from 0 to 5.

The present invention further relates to a macromolecular material composition, wherein the macromolecular material is a polyolefin resin.

The present invention further relates to a macromolecular composition, wherein the polyolefin resin is polyethylene or polypropylene.

The present invention further relates to a modifier for macromolecular material which comprises as an essential component the polyvinyl cyclohexane compound having hydroindane structure.

DESCRIPTION OF THE PREFERRED EMBODIMENTS

The macromolecular material composition of the present invention comprises a polyvinyl cyclohexane compound having hydroindane structure as an essential ingredient.

The macromolecular materials used in the present invention include thermoplastic resins, thermosetting resins and rubbers.

The thermoplastic resins include, for example, (1) crystalline polyolefin [polyethylene, such as low density polyethylene, high density polyethylene and straight chain low density polyethylene; polypropylene, random or block copolymers of propylene and small amount of other olefin (ethylene, butene-1, pentene-1,4-methyl pentene-1, n-octene and the like), polybutene-1, copolymers of butene-1, and small amount of other olefin], (2) olefinic elastomers [ethylene-propylene copolymer rubber, ethylene-propylene-butadiene copolymer rubber, ethylene-propylene-conjugate diene(ethylidene norbornene, dicyclopentadiene, 1,4-hexadiene and the like) copolymer rubber], (3) olefinic thermoplastic elastomers [mixture of the component (1) as hard segment, and component (2) as soft segment at any ratio, a partially or fully crosslinked product prepared by adding a crosslinking agent such as organic peroxide to a fused mixture of components (1) and (2), and a mixture of the crosslinked product and component (1) at any ratio], polyester resins such as polyethylene terephthalate and polybutylene terephthalate; polystyrene, syndiotactic polystyrene, polyamide, polycarbonate, polyphenylene oxide and polyphenylene sulfide. Any of thermoplastic resin can be used effectively independent of kind of catalyst for polymerization, presence or absence of residue of polymerization, molecular weight, molecular weight distribution, kind or presence or absence of steric regularity such as isotactic index and syndiotactic index, melt flow rate, percentage of insoluble components in an organic solvent such as hexane or toluene, and density.

The thermosetting resins, for example, include phenol resin, epoxy resin, urethane resin, melamine resin, urea resin, unsaturated polyester resin and diallyl phthalate resin, silicon resin and polyimide resin.

The rubbers, for example, include butadiene rubber, acrylonitrile-butadiene rubber, styrene butadiene rubber, acrylonitrile-butadiene-styrene rubber and natural rubber.

Among the macromolecular materials, polyolefin resins, in particular, polyethylene and polypropylene are preferred, because of excellent mechanical characteristics, such as bending modulus and bending strength.

The polyvinyl cyclohexane compounds having hydroindane structure used in the present invention, for example, include compound group No. I of the general formula (I), compound group No. II of the general formula (II) and compound group No. III of the general formula (III).

compound group No. I

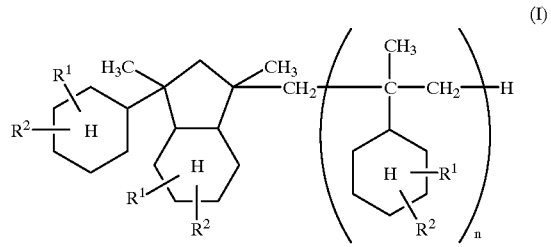

(I)

In the formula, $R^1$ and $R^2$ are the same or different, and represent hydrogen atoms or alkyl groups having from 1 to 12 carbon atoms, and n is an integer from 0 to 5.

compound group No. II

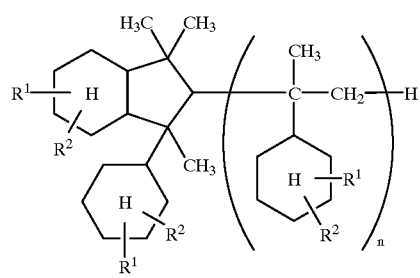

(II)

In the formula, $R^1$, $R^2$ and n are the same as defined in the formula (I).

compound group No. III

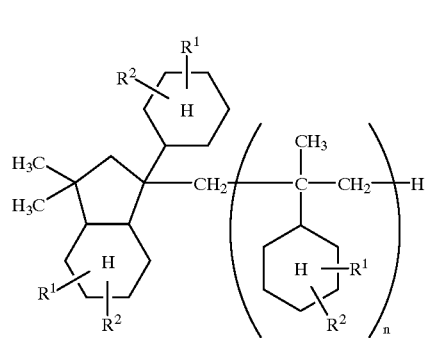

(III)

In the formula, $R^1$, $R^2$ and n are the same as defined in the formula (I).

In the formula (I), alkyl groups expressed by $R^1$ and $R^2$ include, for example, methyl group, ethyl group, propyl group, butyl group, pentyl group, hexyl group, heptyl group, octyl group, nonyl group, decyl group, undecyl group and dodecyl group.

These compounds can be prepared by hydrogenating a cyclic polymer of α-methyl styrene prepared by known method (for example, oligomer having indane structure, such as dimer and trimer prepared by heating α-methyl styrene in the presence of a catalyst such as ethyl aluminum dichloride) by well-known method.

More concretely, α-methyl styrene trimer as a trimer having indane structure can be prepared by the method disclosed in J. P. KOKOKU No. Hei 8-2329, or Polymer Journal, Vol. 13, No. 10, p947, using α-methyl styrene as a starting material.

α-Methyl styrene trimer is charged in an autoclave, and then is hydrogenated using palladium-carbon catalyst at 180° C., and 5 MPa for 5 hours to prepare the compound of formula (I) wherein $R^1$ and $R^2$ are hydrogen, and n is ranging from 0 to 5, for example, in the case of n=1, a compound having boiling point of 223 to 228° C. at 1 Torr is obtained. In this reaction, the compound of formula (II) which is an isomer of the compound of formula (I), and the compound of formula (III) which is an isomer of the compound of formula (I) may be prepared.

In the present invention, the polyvinyl cyclohexane compound having hydroindane structure may be used either alone or in combination of two or more of them.

The amount of the polyvinyl cyclohexane compound having hydroindane structure is preferably 0.01 to 200 parts by weight, more preferably 0.05 to 100 parts by weight, most preferably 0.1 to 30 parts by weight, based on 100 parts by weight of the macromolecular material. This is because if the amount of the polyvinyl cyclohexane compound having hydroindane is lower than 0.01 parts by weight, improvement of macromolecular material (improvement of mechanical strength, such as melt flow characteristics, flexibility at a low temperature, bending strength and bending modulus) is insufficient. While if it exceeds 200 parts by weight, mechanical strength will fall.

If necessary, the macromolecular material composition of the present invention may contain various additives, such as phenolic antioxidant, phosphorus antioxidant, thioether antioxidant, ultraviolet light absorber, hindered amine light stabilizer, nucleating agent, heavy metal-inactivating agent, antistatic additive, lubricant, bulking agent, fire retardant and metal soap.

The phenolic antioxidants include, for example, 2,6-di-tertiary-butyl-p-cresol, 2,6-diphenyl-4-octadecyloxy phenol, stearyl(3,5-di-tertiary-butyl-4-hydroxy phenyl) propionate, distearyl(3,5-di-tertiary-butyl-4-hydroxy benzyl)phosphonate, thiodiethylene bis[(3,5-di-tertiary-butyl-4-hydroxy phenyl)propionate], 4,4'-thio bis(6-tertiary-butyl-m-cresol), 2-octylthio-, 6-di(3,5-di-tertiary-butyl-4-hydroxy phenoxy)-s-triazine, 2,2'-methylene bis(4-methyl-6-tertiary-butyl phenol), bis[3,3-bis(4-hydroxy-3-tertiary-butyl phenyl)butyric acid]glycol ester, 4,4'-butylidene bis(6-tertiary-butyl-m-cresol), 2,2'-ethylidene bis(4,6-di-tertiary-butyl phenol), 1,1,3-tris(2-methyl-4-hydroxy-5-tertiary-butyl phenyl) butane, bis[2-tertiary-butyl-4-methyl-6-(2-hydroxy-3-tertiary-butyl-5-methyl benzyl)phenyl] telephthalate, 1,3,5-tris(2,6-dimethyl-3-hydroxy-4-tertiary-butyl benzyl)isocyanurate, 1,3,5-tris(3,5-di-tertiary-butyl-4-hydroxy benzyl)isocyanurate, 1,3,5-tris(3,5-di-tertiary-butyl-4-hydroxy benzyl-2,4,6-trimethyl benzene, 1,3,5-tris[(3,5-di-tertiary-butyl-4-hydroxy phenyl) propionyloxyethyl]isocyanurate, tetrakis[methylene-3-(3,5-di-tertiary-butyl-4-hydroxy phenyl)propionate]methane, 2-tertiary-butyl-4-methyl-6-(2-acryloyloxy-3-tertiary-butyl-5-methyl benzyl) phenol, 3,9-bis[1,1-dimethyl-2-hydroxyethyl)-2,4-8,10-tetraoxaspiro[5,5]undecane-bis[β-(3-tertiary-butyl-4-hydroxy-5-butyl phenyl)propionate], and triethylene glycol bis[β-(3-tertiary-butyl-4-hydroxy-5-methyl phenyl)propionate].

The amount of the phenolic antioxidant is preferably 0.001 to 5 parts by weight, more preferably 0.01 to 3 parts by weight, based on 100 parts by weight of the macromolecular material.

The organic phosphorus antioxidants include, for example, tris methyl phenyl phosphite, tris nonyl phenyl phosphite, tris(2,4-di-tertiary-butyl phenyl)phosphite, di(tridecyl) pentaerythritol diphosphite, distearyl pentaerythritol diphosphite, bis(2,4-di-tertiary-butyl phenyl) pentaerythritol diphosphite, bis(2,6-di-tertiary-butyl-4-methyl phenyl)pentaerythritol diphosphite, bis(2,4,6-tri-tertiary-butyl phenyl)pentaerythritol diphosphite, bis(2,4-dicumyl phenyl)pentaerythritol diphosphite, tetra(tridecyl) isopropylidene diphenol diphosphite, tetra(tridecyl)-4,4'-n-butylidene bis(2-tertiary-butyl-5-methyl phenol) diphosphite, hexa(tridecyl)-1,1,3-tris(3-tertiary-butyl-4-hydroxy-5-methyl phenyl)butane triphosphite, 2,2'-methylene bis(4,6-di-tertiary-butyl phenyl)octyl phosphite, 2,2'-methylene bis(4,6-di-tertiary-butyl phenyl)octadecyl phosphite, 2,2'-methylene bis(4,6-di-tertiary-butyl phenyl) fluoro phosphite, tris(2-[(2,4,8,10-tetrakis-tertiary-butyl dibenzo[d,f][1,3,2]dioxa phosphepin-6-yl)oxy]ethyl)amine, (2,6-di-tertiary-butyl-4-methyl phenyl)-2-ethyl-2-butyl-1,3-propanediol phosphite, tetrakis(2,4-di-tertiary-butyl phenyl) biphenylene diphosphonite and 9,10-dihydro-9-oxa-10-phosphaphenanthrene-10-oxide.

The amount of the organic phosphorus antioxidant is preferably 0.001 to 5 parts by weight, more preferably 0.01 to 3 parts by weight, based on 100 parts by weight of the macromolecular material.

The thioether antioxidants include, for example, dialkyl thiodipropionates such as dilauryl thiodipropionate, dimyristyl thiodipropionate, myristyl stearyl thiodipropionate and distearyl thiodipropionate, β-alkylmercapto propionate ester such as pentaerythritol tetra(β-dodecyl mercapto propionate).

The amount of the ether antioxidant is preferably 0.001 to 5 parts by weight, based on 100 parts by weight of the macromolecular material.

The ultraviolet light absorbers include, for example, 2-hydroxy benzophenones such as 2,4-dihydroxy benzophenone, 2-hydroxy-4-methoxy benzophenone, 2-hydroxy-4-octoxy benzophenone and 5,5'-methylene bis (2-hydroxy-4-methoxy benzophenone); 2-(2-hydroxy phenyl)-benzotriazoles such as 2-(2-hydroxy-5-methyl phenyl)benzotriazole, 2-(2-hydroxy-5-tertiary-octyl phenyl) benzotriazole, 2-(2-hydroxy-3,5-di-tertiary-butyl phenyl)-5-chloro benzotriazole, 2-(2-hydroxy-3-tertiary-butyl-5-methyl phenyl)-5-chloro benzotriazole, 2-(2-hydroxy-3,5-dicumyl phenyl)benzotriazole, 2,2-methylene bis(4-tertiary-octyl-6-benzotriazolyl)phenol, polyethylene glycol ester of 2-(2-hydroxy-3-tertiary-butyl-5-carboxy phenyl) benzotriazole; benzoates such as phenyl salicylate, resorcinol monobenzoate, 2,4-di-tertiary-butyl phenyl-3,5-di-tertiary-butyl-4-hydroxy benzoate and hexadecyl-3,5-di-tertiary-butyl-4-hydroxy benzoate; substituted oxanilides such as 2-ethyl-2'-ethoxy oxanilide and 2-ethoxy 4'-dodecyl oxanilide; cyanoacrylates such as ethyl-α-cyano-β, βdiphenyl acrylate and methyl-2-cyano-3-methyl-3-(p-methoxy phenyl)acrylate; triaryl triazines such as 2-(2-hydroxy-4-octoxy phenyl)-4,6-bis(2,4-di-tertiary-butyl phenyl)-s-triazine, 2-(2-hydroxy-4-methoxy phenyl)-4,6-diphenyl-s-triazine, 2-(2-hydroxy-4-propoxy-5-methyl phenyl)-4,6-bis(2,4-di-tertiary-butyl phenyl)-s-triazine.

The amount of the ultraviolet light absorber is preferably 0.001 to 10 parts by weight, based on 100 parts by weight of the macromolecular material.

The hindered amine light stabilizers include, for example, 2,2,6,6-tetramethyl-4-piperidyl benzoate, 1,2,2,6-pentamethyl-4-piperidyl stearate, 2,2,6,6-tetramethyl-4-piperidyl stearate, bis(2,2,6,6-tetramethyl-4-piperidyl) sebacate, bis(1,2,2,6,6-pentamethyl-4-piperidyl)sebacate, tetrakis(2,2,6,6-tetramethyl-4-piperidyl)butane tetra carboxylate, tetrakis(1,2,2,6,6-pentamethyl-4-piperidyl) butane tetra carboxylate, bis(1,2,2,6,6-pentamethyl-4-piperidyl)di(tridecyl)-1,2,3,4-butane tetra carboxylate, bis (1,2,2,6,6-pentamethyl-4-piperidyl)-2-butyl-2-(3,5-di-tertiary-butyl-4-hydroxy benzyl)malonate, 1-(2-hydroxy ethyl)-2,2,6,6-tetramethyl-4-piperidinol/diethyl succinate polycondensate, 1,6-bis(2,2,6,6-tetraethyl-4-piperidyl amino)hexane/dibromoethane polycondensate, 1,6-bis(2,2,6,6-tetramethyl-4-piperidyl amino)hexane/2,4-dichloro-6-morpholino-s-triazine polycondensate, 1,6-bis(2,2,6,6-tetramethyl-4-piperidyl amino)hexane/2,4-dichloro-6-tertiary-octyl amino-s-triazine polycondensate, 1,5,8,12-tetrakis[2,4-bis(N-butyl-N-(2,2,6,6-tetramethyl-4-piperidyl) amino)-s-triazine-6-yl]-1,5,8,12-tetraazadodecane, 1,5,8,12-tetrakis[2,4-bis(N-butyl-N-(1,2,2,6,6-pentamethyl-4-piperidyl)amino)-s-triazine-6-yl]-1,5,8,12-tetraazadodecane, 1,6,11-tris[2,4-bis(N-butyl-N-(2,2,6,6-tetramethyl-4-piperidyl)amino)-s-triazine-6-yl amino]

undecane, and 1,6,11-tris[2,4-bis(N-butyl-N-(1,2,2,6,6-pentamethyl-4-piperidyl)amino)-s-triazine-6-yl amino] undecane.

The amount of the hindered amine light stabilizer is preferably 0.001 to 10 parts by weight, based on 100 parts by weight of the macromolecular material.

The nucleating agents include, for example, dibenzylidene sorbitol, hydroxy—di (t-butyl benzoic acid) aluminum, bis(4-t-butyl-phenyl) sodium phosphate, methylene bis(2,4-di-t-butyl-phenyl) phosphate sodium salt.

The amount of the nucleating agent is preferably 0.001 to 5 parts by weight, based on 100 parts by weight of the macromolecular material.

The heavy metal-inactivating agents include, for example, amide compounds such as oxalic amides and salicylic amides and hydrazide compounds.

The amount of the heavy metal-inactivating agent is preferably 0.001 to 5 parts by weight, based on 100 parts by weight of the macromolecular material.

The antistatic additives include, for example, fatty acid salts, higher fatty alcohol sulfate ester salts, aliphatic amines, sulfates of amide, aliphatic alcohol phosphate ester salts, alkylallyl sulfonates, aliphatic amine salts, quaternary ammonium salts, alkyl pyridium salts, polyoxyethylene alkyl ethers, polyoxyethylene alkyl phenol ethers, polyoxyethylene alkylamines, polyoxyethylene alkylamine-amides, sorbitans, betaines, imidazoline derivatives.

The amount of the antistatic additive is preferably 0.001 to 5 parts by weight, based on 100 parts by weight of the macromolecular material.

The lubricants include, for example, liquid paraffin, paraffin wax, polyethylene wax, stearyl alcohol, stearic acid, 12-hydroxy stearic acid, stearic acid amide, oleic acid amide, erucic acid amide, methylene bis stearic acid amide, ethylene bis stearic acid amide, calcium stearate, zinc stearate, magnesium stearate, lead stearate, hydrogenated oil, stearic acid monoglyceride, butyl stearate, pentaerythritol tetra stearate and stearyl stearate.

The amount of the lubricant is preferably 0.001 to 10 parts by weight, based on 100 parts by weight of the macromolecular material.

The bulking agents include, for example, calcium carbonate, barium sulfate, calcium sulfate, titanium oxide, silicon oxide, zinc oxide, clay and various hydroxides.

The amount of the bulking agent is preferably 0.01 to 200 parts by weight, based on 100 parts by weight of the macromolecular material.

The fire retardants include, for example, tetrabromobisphenol A, decabromodiphenyl ether, tetrabromodiphenyl ether, hexabromobenzene, hexabromo cyclodecane, tetrabromo phthalic anhydride, chlorinated polyethylene, perchloro cyclopentadecane, chlorendic acid, tetrachloro phthalic anhydride, tricresyl phosphate, triphenyl phosphate, cresyl diphenyl phosphate, condensated polyphosphate, tris chloroethyl phosphate, tris chloropropyl phosphate, antimony polyphosphate, nitrogen-containing phosphorus compound, polymerizable phosphate compound monomer (vinyl phosphonate), red phosphorus compound, aluminum hydroxide, antimonous oxide, magnesium hydroxide, zinc borate, zirconium compound, molybdenum compound, tin oxide, phosphorus pentaoxide and nitrogenated guanidine.

The amount of the fire retardant is preferably 1 to 100 parts by weight, based on 100 parts by weight of the macromolecular material.

The metal soaps include, for example, soaps of metals of II group of the periodic table, such as lithium stearate, magnesium stearate, calcium laurate, calcium ricinoleate, calcium stearate, barium laurate, barium ricinoleate, barium stearate, zinc octoate, zinc laurate, zinc ricinoleate and zinc stearate.

The amount of the metal soap is preferably 0.01 to 5 parts by weight, based on 100 parts by weight of the macromolecular material.

The macromolecular material composition of the present invention can be prepared by mixing the macromolecular material, polyvinyl cyclohexane compound having hydroindane structure, and optional additives, with kneading machine such as kneader, Banbury mixer, and Henschel mixer. The macromolecular material composition can be used for various purpose such as film, sheet, covering material, packing wrap and various molding materials.

The present invention will hereinafter be described in more detail with reference to the following working Examples, but the present invention is not restricted to these specific Examples.

EXAMPLES 1-1 to 1-4, AND COMPARATIVE EXAMPLES 1-1 to 1-4

100 Parts by weight of polypropylene homopolymer (Trade name, H-700; Idemitsu Petroleum Chemistry Co., Ltd.), 0.1 parts by weight of calcium stearate, 0.1 parts by weight of tetrakis[3-(3,5-di-tertiary-butyl-4-hydroxy phenyl)propionyloxymethyl]methane, 0.1 parts by weight of tris(2,4-di-tertiary-butyl phenyl)phosphite and a modifier for macromolecular material shown in Table 1 were mixed with Henschel mixer for 5 minutes. The mixture was extruded at 250° C. and 25 rpm to obtain pellet. The pellet was injection-molded at 250° C. to prepare a square bar of 12.25 mm×4.8 mm.

Melt flow rate (MFR) (g/10 minutes) of the pellet thus obtained was measured at 230° C. for 2.16 kg in accordance with JIS K 7210. The crystallization temperature (° C.) was measured by a differential scanning calorimeter. The bending strength (MPa) and the bending modulus (MPa) of the square bar were measured in accordance with JIS K 7171. The results were shown in Table 2.

TABLE 1

| No. | modifier for macromolecular material | parts by weight |
| --- | --- | --- |
| Example 1-1 | compound group No.I ($R^1$:H,$R^2$:H,n = 1) | 0.5 |
| Example 1-2 | compound group No.II ($R^1$:H,$R^2$:H,n = 1) | 0.5 |
| Example 1-3 | compound group No.III ($R^1$:$CH_3$,$R^2$:H,n = 1) | 0.5 |
| Example 1-4 | compound group No.I ($R^1$:H,$R^2$:H,n = 0) | 0.5 |
| Comparative Example 1-1 | none | — |
| Comparative Example 1-2 | naphthenic process oil | 0.5 |
| Comparative Example 1-3 | 1,2-bis (3,4-dimethyl phenyl) ethane | 0.5 |
| Comparative Example 1-4 | 2,4-dimethyl-2,4,6-tricyclohexyl heptane | 0.5 |

TABLE 2

| No. | MFR (g/10 min) | crystallization temperature (° C.) | bending test | |
|---|---|---|---|---|
| | | | bending strength (MPa) | bending modulus (MPa) |
| Example 1-1 | 15.1 | 125 | 36 | 1058 |
| Example 1-2 | 15.2 | 123 | 37 | 1056 |
| Example 1-3 | 15.1 | 123 | 38 | 1066 |
| Example 1-4 | 15.5 | 123 | 36 | 1050 |
| Comparative Example 1-1 | 12.2 | 116 | 32 | 821 |
| Comparative Example 1-2 | 12.5 | 115 | 28 | 789 |
| Comparative Example 1-3 | 14.1 | 118 | 30 | 819 |
| Comparative Example 1-4 | 13.6 | 115 | 31 | 816 |

EXAMPLES 2-1 to 2-5, AND COMPARATIVE EXAMPLES 2-1 to 2-4

The same procedures of Example 1-1 were repeated to obtain the results shown in Table 4 except that the amount of the modifiers for macromolecular material were changed as shown in Table 3.

TABLE 3

| No. | modifier for macromolecular material | parts by weight |
|---|---|---|
| Example 2-1 | compound group No.I ($R^1$:H,$R^2$:H,n = 1) | 10 |
| Example 2-2 | compound group No.I ($R^1$:H,$R^2$:H,n = 1) | 15 |
| Example 2-3 | compound group No.I ($R^1$:H,$R^2$:H,n = 1) | 20 |
| Example 2-4 | compound group No.I ($R^1$:H,$R^2$:H,n = 0) | 10 |
| Example 2-5 | compound group No.I ($R^1$:H,$R^2$:H,n = 0) | 20 |
| Comparative Example 2-1 | none | — |
| Comparative Example 2-2 | naphthenic process oil | 10 |
| Comparative Example 2-3 | 1,2-bis (3,4-dimethyl phenyl) ethane | 10 |
| Comparative Example 2-4 | 2,4-dimethyl-2,4,6-tricyclohexyl heptane | 10 |

TABLE 4

| No. | MFR (g/10 min) | crystallization temperature (° C.) | bending test | |
|---|---|---|---|---|
| | | | bending strength (MPa) | bending modulus (MPa) |
| Example 2-1 | 19.4 | 120 | 36 | 726 |
| Example 2-2 | 24.1 | 118 | 37 | 603 |
| Example 2-3 | 26.9 | 118 | 38 | 468 |
| Example 2-4 | 21.3 | 118 | 35 | 715 |
| Example 2-5 | 28.0 | 117 | 35 | 450 |
| Comparative Example 2-1 | 12.2 | 116 | 32 | 821 |
| Comparative Example 2-2 | 15.8 | 115 | 24 | 567 |
| Comparative Example 2-3 | 16.6 | 118 | 38 | 612 |
| Comparative Example 2-4 | 17.2 | 115 | 30 | 633 |

EXAMPLES 3-1 to 3-3, AND COMPARATIVE EXAMPLES 3-1 to 3-3

50 Parts by weight of ethylene-propylene copolymer rubber (content of ethylene: 71 mole %, iodine number: 0, Mooney viscosity $ML_{1+4}$(100° C.): 60), 40 parts by weight of polypropylene (MFR: 13 g/10 min), 10 parts by weight of butyl rubber (Mooney viscosity $ML_{1-4}$(100° C.): 45, degree of unsaturation: 1 mole %) and 5 parts by weight of a modifier for macromolecular material shown in Table 5 were mixed with Banbury mixer at 180° C. for 5 minutes. To the mixture, one part by weight of 2,5-dimethyl 2,5-bis (tertiary-butyl peroxy) hexane was added. The mixture was extruded at 210° C. to obtain pellet.

MFR of the pellet thus obtained was measured in the same manner as in Example 1-1. The pellet was injection-molded at a temperature of 200° C., and at an injection pressure (primary pressure: 130 MPa, secondary pressure: 70 MPa) to prepare test piece having a thickness of 3 mm. The test piece was measured for tensile elongation at break (%), and presence or absence of flow marks (visual observation) (marks of resin flow produced during injection molding and remained on the surface of the molded product, which damage appearance of the product and reduce commercial value) on the test piece in accordance with JIS K 7113 (sample shape: No.2 test piece, distance between chuck: 80 mm, elongation speed: 50 mm/min, temperature: 23° C). The gloss (60 degrees gloss) of the test piece was measured in accordance with JIS K 7105. The results are shown in Table 6.

TABLE 5

| No. | modifier for macromolecular material |
|---|---|
| Example 3-1 | compound group No.I/ compound group No.II = 1/1 (weight/weight) No.I; ($R^1$:H,$R^2$:H,n = 1) No.II;($R^1$:H,$R^2$:H,n = 1) |
| Example 3-2 | compound group No.III ($R^1$:H,$R^2$:H,n = 1) |
| Example 3-3 | compound group No.I ($R^1$:H,$R^2$:H,n = 0) |
| Comparative Example 3-1 | none |
| Comparative Example 3-2 | naphthenic process oil |
| Comparative Example 3-3 | 1-dimethyl-1,3-dicyclohexyl butane |

TABLE 6

| No. | MFR (g/10 min) | elongation(%) | flow marks | gloss |
|---|---|---|---|---|
| Example 3-1 | 3.7 | 620 | none | 39 |
| Example 3-2 | 4.1 | 660 | none | 41 |
| Example 3-3 | 4.5 | 690 | none | 40 |
| Comparative Example 3-1 | 0.6 | 590 | many | 12 |
| Comparative Example 3-2 | 2.1 | 600 | a little | 17 |
| Comparative Example 3-3 | 2.9 | 610 | none | 33 |

EXAMPLES 4-1 to 4-3, COMPARATIVE EXAMPLES 4-1 to 4-3

0.1 Parts by weight of tetrakis[methylene-3-(3,5-di-tertiary-butyl-4-hydroxy phenyl)propionate]methane and 5 parts by weight of a modifier for macromolecular material shown in Table 7 were added to 100 parts by weight of unstabilized polypropylene (Trade name, Profax 6501; Montel Co., Ltd.), and the mixture was mixed sufficiently, and the mixture was extruded to obtain pellet.

MFR of the pellet thus obtained was measured in the same to manner as in Example 1-1. The pellet was injection-molded at a temperature of 200° C. to prepare test piece having thickness of 1 mm. The brittle temperature was measured in accordance with JIS K 7216. The results are shown in Table 7.

TABLE 7

| No. | modifier for macromolecular material | MFR (g/10 min) | brittle temperature (° C.) |
| --- | --- | --- | --- |
| Example 4-1 | compound group No.I ($R^1$:H,$R^2$:H,n = 1) | 7.3 | −46 |
| Example 4-2 | compound group No.III ($R^1$:H,$R^2$:H,n = 1) | 7.5 | −44 |
| Example 4-3 | compound group No.I ($R^1$:$CH_3$,$R^2$:H,n = 0) | 8.2 | −58 |
| Comparative Example 4-1 | none | 2.8 | 18 |
| Comparative Example 4-2 | α-methyl styrene trimer | 4.5 | −9 |
| Comparative Example 4-3 | 2,4-dimethyl-2,4,6-tricyclohexyl heptane | 5.3 | −27 |

EXAMPLES 5-1 to 5-4, COMPARATIVE EXAMPLES 5-1 to 5-4

0.1 parts by weight of tetrakis[methylene-3-(3,5-di-tertiary-butyl-4-hydroxy phenyl)propionate]methane, 0.1 parts by weight of tris[(2,4-di-tertiary-butyl phenyl) phosphite, 0.1 parts by weight of calcium stearate and 5.0 parts by weight of a modifier for macromolecular material shown in Table 8 were added to 100 parts by weight of unstabilized polypropylene (Trade name, Hizex 3300FP; Mitsui Petroleum Chemistry Co., Ltd.). The mixture was mixed sufficiently, and extruded to prepare pellet.

MFR and crystallization temperature of the pellet were measured in the same manner as in Example 1-1. The results are shown in Table 8.

TABLE 8

| No. | modifier for macromolecular material | MFR (g/10 min) | crystallization temperature (° C.) |
| --- | --- | --- | --- |
| Example 5-1 | compound group No.I ($R^1$:H,$R^2$:H,n = 1) | 4.4 | 117 |
| Example 5-2 | compound group No.II ($R^1$:H,$R^2$:H,n = 1) | 4.6 | 117 |
| Example 5-3 | compound group No.III ($R^1$:$CH_3$,$R^2$:H,n = 1) | 4.7 | 117 |
| Example 5-4 | compound group No.I ($R^1$:H,$R^2$:H,n = 0) | 5.6 | 118 |
| Comparative Example 5-1 | none | 3.7 | 118 |
| Comparative Example 5-2 | naphthenic process oil | 3.9 | 113 |
| Comparative Example 5-3 | 1,2-bis(3,4-dimethyl phenyl) ethane | 4.1 | 115 |
| Comparative Example 5-4 | 2,4-dimethyl-2,4,6-tricyclohexyl butane | 4.1 | 115 |

As has been discussed above in detail, the macromolecular material containing a modifier for macromolecular material of the present invention is excellent in melt flow characteristics. As shown in Examples 1-1 to 1-4, when a small amount of the modifier is added to macromolecular material, the crystallization temperature is raised, and mechanical characteristics such as bending strength and bending modulus are improved. When more than 5 parts by weight of the modifier is used, melt flow characteristics are much improved as compared with the prior art modifiers, but decrease in mechanical strength and crystallization temperature is small. The molded articles prepared from the composition of the present invention have no flow marks on the surface that has high smoothness and good gloss. Further, the macromolecular material composition containing the modifier of the present invention is excellent in flexibility at a low temperature, and has highly decreased brittle temperature.

On the contrary, as shown in comparative Examples, the macromolecular material composition containing alicyclic hydrocarbon softener other than those of the present invention does not show improved melt flow characteristics. The molded articles prepared from the composition have flow marks on the surface that does not have good gloss. The articles have insufficient flexibility at a low temperature.

What is claimed is:

1. A macromolecular material composition comprising a macromolecular material selected from thermoplastic resins, thermosetting resins and rubbers, and a polyvinyl cyclohexane compound having hydroindane structure.

2. The macromolecular material composition of claim 1, wherein the polyvinyl cyclohexane compound having hydroindane structure is represented by the general formula (I):

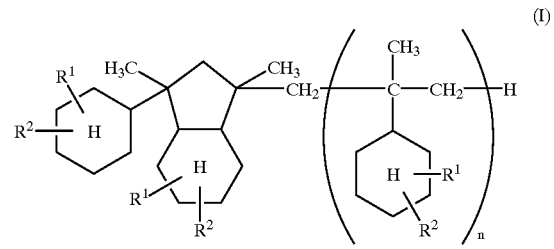

wherein $R^1$ and $R^2$ are the same or different, and represent hydrogen atoms or alkyl groups having from 1 to 12 carbon atoms, and n is an integer ranging from 0 to 5.

3. The macromolecular material composition of claim 1, wherein the macromolecular material is a polyolefin resin.

4. The macromolecular material composition of claim 2, wherein the macromolecular material is a polyolefin resin.

5. The macromolecular material composition of claim 3, wherein the polyolefin resin is polyethylene or polypropylene.

6. The macromolecular material composition of claim 4 wherein the polyolefin resin is polyethylene or polypropylene.

7. A method of using a polyvinyl cyclohexane compound having a hydroindane stricture as a modifier for a macromolecular material, said method comprising combining the macromolecular material with the polyvinyl cyclohexane compound having a hydroindane structure, wherein the amount of polyvinyl cyclohexane compound is sufficient to modify properties of the macromolecular material.

8. The method of claim 7, wherein the polyvinyl cyclohexane compound having a hydroindane structure is represented by the general formula (I):

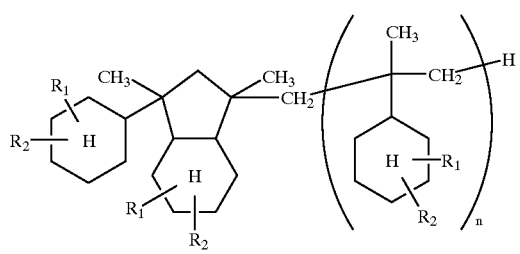

wherein $R_1$ and $R_2$ are the same or different, and represent hydrogen atoms or alkyl groups having from 1 to 12 carbon atoms, and n is an integer ranging from 0 to 5.

9. The method of claim 7, wherein the properties of the macromolecular material which are modified are selected from melt flow, bending modulus, flexibility, and bending strength.

10. The macromolecular material composition of claim 1, wherein the polyvinyl cyclohexane compound having hydroindane stricture is represented by the general formula (II):

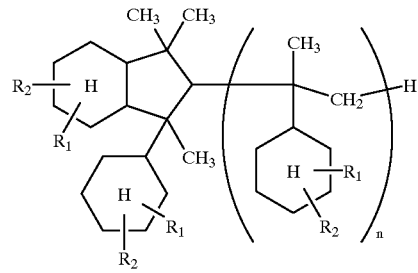

wherein $R_1$ and $R_2$ are the same or different, and represent hydrogen atoms or alkyl groups having from 1 to 12 carbon atoms, and n is an integer ranging from 0 to 5.

11. The macromolecular material composition of claim 1, wherein the polyvinyl cyclohexane compound having hydroindane structure is represented by the general formula (III):

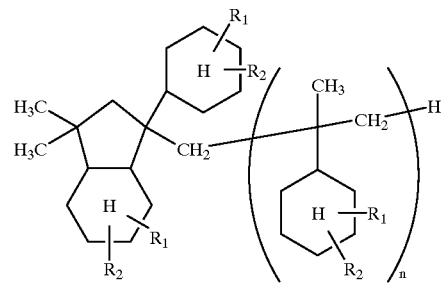

wherein $R_1$ and $R_2$ are the same or different, and represent hydrogen atoms or alkyl groups having from 1 to 12 carbon atoms, and n is an integer ranging from 0 to 5.

* * * * *